United States Patent [19]

Tomisawa

[11] Patent Number: 4,617,509
[45] Date of Patent: Oct. 14, 1986

[54] VOLTAGE REGULATOR FOR A MICROCOMPUTER SYSTEM

[75] Inventor: Naoki Tomisawa, Isesaki, Japan

[73] Assignee: Japan Electronic Control Systems Company Limited, Japan

[21] Appl. No.: 607,395

[22] Filed: May 2, 1984

Related U.S. Application Data

[63] Continuation-in-part of Ser. No. 399,694, Jul. 19, 1982, abandoned.

[30] Foreign Application Priority Data

Jul. 21, 1981 [JP] Japan ................................ 56-114293

[51] Int. Cl.⁴ ............................................... G05F 5/00
[52] U.S. Cl. ..................................... 323/303; 323/901
[58] Field of Search ....................... 323/299, 303, 901; 363/49; 364/483

[56] References Cited

U.S. PATENT DOCUMENTS 4,340,807 7/1982 Raskin et al. .................. 323/299 X
4,351,021 9/1982 Morihisa et al. ............... 323/901 X

*Primary Examiner*—Peter S. Wong
*Attorney, Agent, or Firm*—Lowe, Price, LeBlanc, Becker & Shur

[57] ABSTRACT

A voltage regulator for a microprocessor unit provided with a reset circuit for the microprocessor unit. Voltage from the regulator circuit is applied to the reset circuit as well as to the microprocessor unit. The production of a reset signal during a rise time of the regulator circuit is prevented by delaying generation of a reset signal until the regulator voltage to be applied to the microprocessor level has reached an operating level. The regulator circuit and the reset circuit are commonly formed in an integrated circuit so as to eliminate the wiring therebetween and to reduce size. Further, the reset signal is produced by the reset circuit when a run signal indicative of the proper execution of program steps is not produced at a regular rate.

3 Claims, 8 Drawing Figures

VOLTAGE REGULATOR FOR A MICROCOMPUTER SYSTEM

This is a continuation-in-part of application Ser. No. 399,694, filed on July 19, 1982, now abandoned.

BACKGROUND OF THE INVENTION

The present invention relates to a voltage regulator for a microcomputer system.

Microcomputers are now being applied to various types of machine control. In an internal combustion engine with a fuel injection system, for example, a microcomputer is used for calculating the amount of fuel to be supplied to the engine in accordance with a plurality of parameters such as the rotational speed of the engine and the intake air amount.

In that case, the amount of the fuel must be repeatedly calculated in a short period of time by means of the microcomputer so as to enable precise control of the fuel supply.

Therefore, a number of calculation cycles are executed, in the microcomputer, in accordance with a program stored in a memory which forms a loop of steps for each cycle of calculation.

This type of microcomputer is provided with a reset circuit for automatically resetting to an initial portion of the program steps upon occurrence of so-called "lost executable control", that is, a state in which the program is not correctly executed upon initial application of voltage to the microcomputer by a power supply. The reset circuit produces, immediately after application, or throw-in of voltage to the microcomputer by the power supply, a low level reset signal (logic zero) having a predetermined duration for example.

The reset signal is also produced when the reset circuit detects an abnormal generation of a run signal which is normally generated upon completion of each program cycle.

The thus produced reset signal is applied to a reset terminal of a microprocessor unit.

In the case of the conventional arrangement of the microcomputer system provided with the reset circuit mentioned above, however, there is a problem that the reset operation is not effected if the magnitude of the voltage applied to the microprocessor unit supplied from a voltage regulator circuit is not sufficiently high at the time when the reset signal is applied to the reset terminal of the microprocessor unit.

SUMMARY OF THE INVENTION

An object of the present invention is therfore to provide a voltage regulator for a microcomputer system, by which the reset operation is certainly effected.

To this end, the present invention provides a voltage regulator comprising a regulator means for supplying a stable voltage to a microprocessor unit and a reset means for applying a reset signal to the microprocessor unit. The regulator inhibits production of a reset singal until the voltage level supplied to the microprocessor unit by the regulator means stabilizes following turn on of the power supply.

According to another aspect of the present invention the regulator means and the reset means take the form of circuits formed in a single integrated circuit.

According to further aspect of the present invention, the reset signal is also produced by the reset circuit when the run signal from the microprocesor unit is not provided at a regular rate.

The foregoing and other objects and advantages of the present invention will become more clearly understood upon review of the following description taken in conjunction with the accompanying drawings.

DETAILED DESCRIPTION OF A PREFERRED EMBODIMENT

Figure 1:
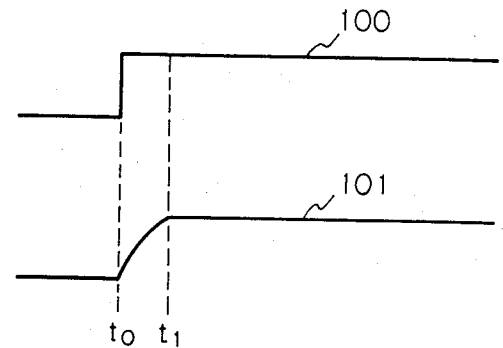
FIG. 1 is a diagram showing input/output voltage waveforms of a voltage regulator circuit.

To provide a better understanding of the present invention, reference is first made to FIG. 1 in which the input/output voltage levels of a voltage regulator circuit generally used for a microprocessor unit are illustrated.

As shown by a line 101, the output voltage of the voltage regulator circuit, i.e., the level of voltage supplied to a conventional microprocessor unit reaches a predetermined constant level at a time $t_1$ after the start time $t_o$ of the power supply. (The turn on characteristic of the power supply is illustrated in an ideal case as line 100).

Therefore, if a reset signal is applied to the microprocessor unit during the time period between $t_o$ and $t_1$ in which the power voltage for the microprocessor unit is not stabilized, the reset operation may not be effected properly as noted previously.

Figure 2:
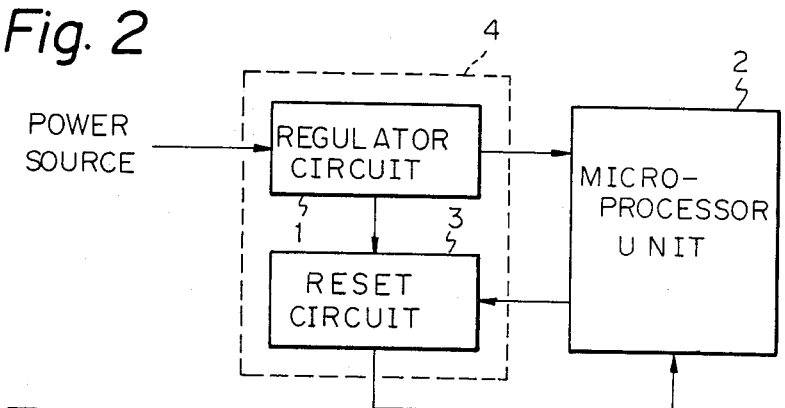
FIG. 2 is a block diagram of an embodiment of a voltage regulator according to the present invention.

Referring to FIG. 2, an embodiment of the present invention will be explained.

In FIG. 2, a voltage regulator 4 generally designated by a portion enclosed by a dashed line comprises a regulator circuit 1 which receives voltage from a DC elecrtric power source (not shown) and supplied a regulated voltage to a microprocessor unit 2.

The voltage regulator 4 also includes a reset circuit 3 for the microprocessor unit 2, and the voltage from the regulator circuit 1 is also applied to the reset circuit 3.

The reset circuit 3 also receives a run signal produced by the microprocessor unit 2 and applies a reset signal to a reset terminal of the microprocessor unit.

Furthermore, the regulator circuit 1 and the reset circuit are commonly formed in a single integrated circuit.

In operation, a regulated voltage from the regulator circuit 1 is applied to the microprocessor unit 2 and the reset circuit 3 at the same time after turn on, or throw-in of the power supply. The reset circuit 3 is prevented by regulator circuit 1 from producing a reset signal during a rise time of the regulator circuit 1 in which the microprocessor unit 2 may not operate properly.

Figure 3:
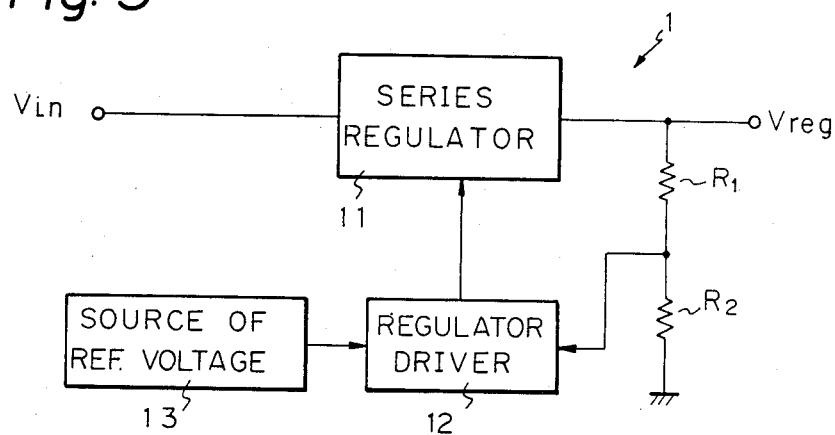
FIG. 3 is a block diagram showing an example of the circuit construction of the regulator circuit 1 of FIG. 2.

Turning to FIG. 3, an example of the construction of the regulator circuit 1 will be specifically explained hereinafter.

As shown, this regulator circuit is made up of a series regulator circuit 11, a regulator driver 12, a source 13 of reference voltage and dividing resistors $R_1$ and $R_2$. The series regulator circuit 11 is, for example, made of a PNP transistor whose emitter is connected to the DC electric power source for receiving the power current.

The base of the PNP transistor is connected to the regulator driver 12 which may preferably be formed by a comparator circuit for comparing a voltage at the junction between the dividing resistors $R_1$ and $R_2$, with a reference voltage generated by the source 13 of reference voltage. A terminal of the dividing resistor $R_1$ is connected to the collector of the PNP transistor and a terminal of the dividing resistor $R_2$ is grounded. Further, the voltage at the collector of the PNP transistor is outputted as a regulated power voltage $V_{reg}$ to be applied to the reset circiut 4 and the microprocessor unit 2.

With this construction, magnitude of the current flowing through the emitter and the collector of the PNP transistor is controlled by the control voltage applied to the base of the PNP transistor, so that the level of the output voltage $V_{reg}$ of the regulator circuit 1, which appears at the collector of the PNP transistor, is maintained at a constant level, for instance, of 5 V.

Figure 4:
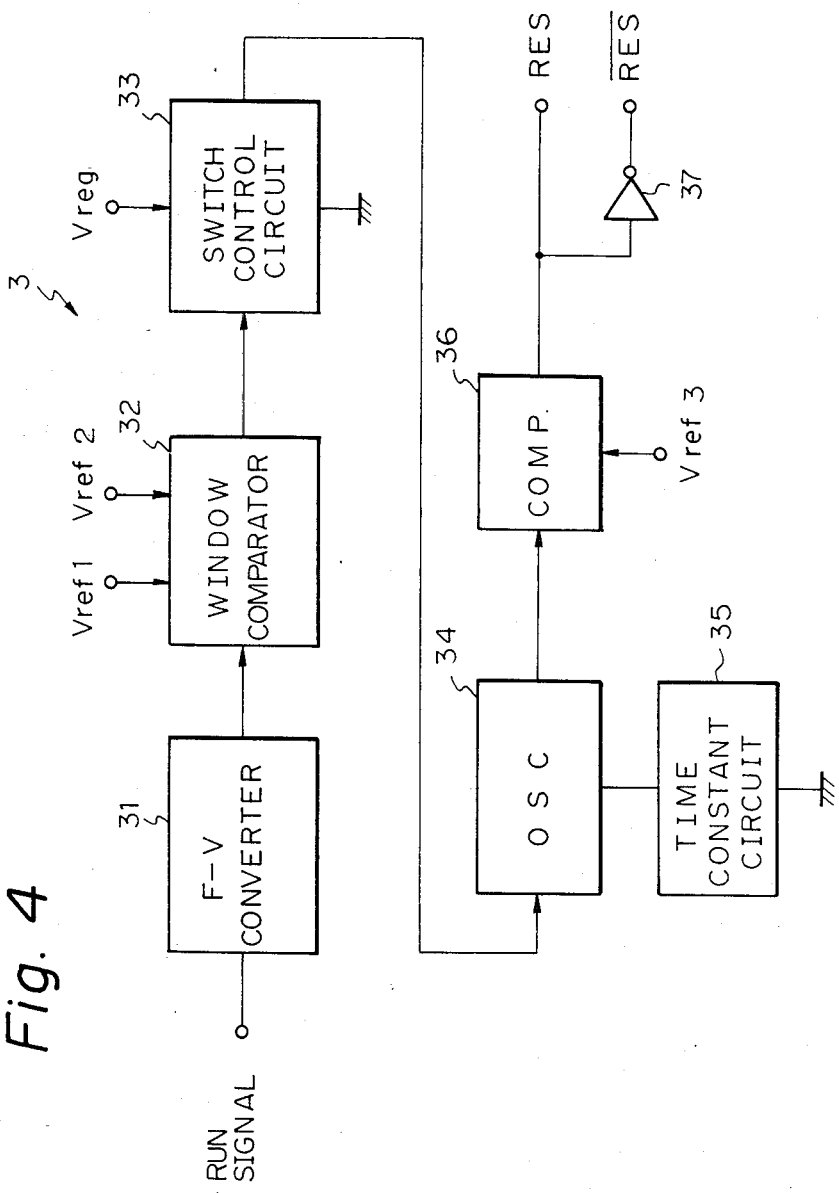
FIG. 4 is a block diagram showing an example of the circuit construction of the reset circuit 3 of FIG. 2.

Turning to FIG. 4, the circuit construction of the reset circuit 3 will be explained more specifically hereinafter. As shown, the run signal from the microprocessor unit 2 is applied to an F-V converter 31 which produces an output signal whose voltage level is substantially proportional to the frequency of an input signal. Therefore, the output signal level of the F-V converter 31 is proportional to the frequency of the run signal from the microprocessor unit 2 which, for example, lies between 10 Hz and 500 Hz. The output signal of the F-V converter 31 is then applied to a window comparator 32 which also receives a couple of reference voltages $V_{ref1}$ and $V_{ref2}$. The reference voltage $V_{ref2}$ is selected to be higher than the reference voltage $V_{ref1}$, and the level of an output signal of the wondow comparator 32 remains low when the level of the output signal of the F-V converter applied to the window comparator 32 lies between the levels of the reference voltage signals $V_{ref1}$ and $V_{ref2}$. On the other hand, if the voltage level of the output signal of the F-V converter 31 is lower than the reference voltage $V_{ref1}$ or higher than the reference voltage $V_{ref2}$, the output signal of the window comparator 32 becomes high.

The output signal of the window comparator 32 is, in turn, applied to a switch control circuit 33 for controlling the operation of an oscillator 34. The switch control circuit 32 is connected to a line of power voltage $V_{reg}$ produced by the regulator circuit 1, and includes, for example, a constant current element connected to the line of the voltage Vreg and a switching transistor connected between constant current element and the ground and whose base is applied with the output signal of the window comparator 32. Thus, the switch control circuit 33 produces a high level output signal when the output signal of the window comparator is low, and a low level output signal when the output signal of the window comparator 32 turns high.

The oscillator 34 produces an oscillation signal having the period around 150 ms (milli seconds) when the switch control circuit 33 produces the low level output signal. Further, a time constant circuit 35, for example, made up of a parallel circuit of a capacitor and a resistor is provided between a terminal of the oscillator and the ground, to determine the oscillation frequency of the oscillator 34. Further, the oscillator 34 produces a high level constant output signal when inactivated and upon application of the power current, there is a delay of the rise up of the output signal level of the oscillator 34. This is due to the presence of the time constant characteristics of the time constant circuit 35.

The output signal of the oscillator 34 is then applied to a comparator 36 which also receives a reference votage $V_{ref3}$. The purpose of this comparator circuit 36 is to produce a rectangular pulse train signal in accordance with the output signal of the oscillator 34. More specifically, the comparator circuit 36 produces a low level output signal when the level of the input signal is higher than the reference voltage $V_{ref3}$ and produces a high level output signal when the level of the input signal is lower than the reference voltage $V_{ref3}$. The output signal of the comparator circuit 36 can be used as the reset signal. In other words, the comparator circuit 36 operates as a waveshaper circuit for producing the reset signal from the output signal of the oscillator 34.

In this embodiment, an inverter 37 is further provided to turn over the polarity of the reset signal from the comparator 36, to produce a negative logic reset signal at a terminal $\overline{RES}$, which is to be applied to the microprocesor unit 2.

Figure 5A:
FIGS. 5A through 5C are timing charts showing the operation of the reset circuit 3 in various conditions of the operation of the microprocessor unit.
Figure 5B:
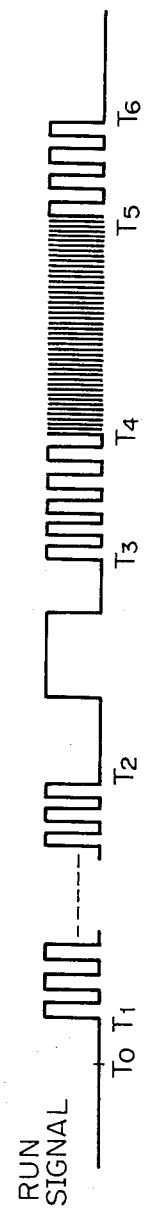
Figure 5C:
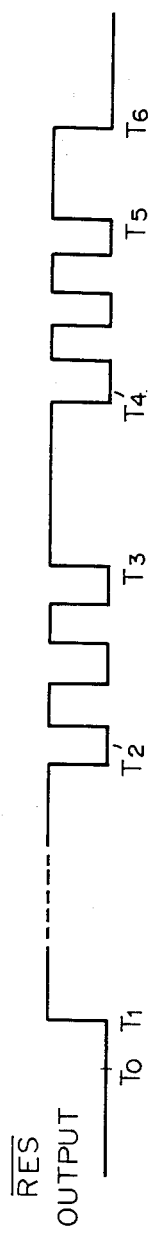

Reference is now made to the timing charts of FIG. 5A through FIG. 5C which illustrate the operation of the embodiment of the regulator circuit shown in FIG. 2 through 4.

Assume that the power voltage Vreg is applied to the reset circuit 3 during a time period between $T_0$ and $T_6$, as illustrated in FIG. 5A. Upon receipt of the power voltage Vreg, the reset circuit 3 produces a low level reset signal at the terminal $\overline{RES}$ for a time period between $T_0$ and $T_1$ as illustrated in the left side end of FIG. 5C. The production of this reset signal is due to the operation of the time constant circuit 35 and the duration is, for example, around 100 ms. Thus the reset circuit 3 produces the low level reset signal which is sufficiently longer than the time period after the turn on of the power supply in which the mecroprocessor unit 2 may not operate properly. In other words, the initialization of the execution of the program steps is certainly performed by this reset signal produced by the reset circuit 3.

The manner of generation of the reset signal according to the run signal of the microprocessor will be further explained with reference to FIGS. 5B and 5C.

FIG. 5B shows, in a sequence, verious states of the generation of the run signal. Assume that the run signal is generated regularly in accordance with the normal operation of the microprocessor unit 2 during the time period between $T_1$ and $T_2$. In this state, the output signal of the F-V converter 31 has a level within the threshold range of the window comparator 32 and the window comparator 32 produces the low level ouput signal which turns off the switch control circuit 33. Therefore, the oscillator circuit 34 is applied with a high level control signal to cease the oscillation and produces the high level constant output signal. With this operation, the output signal level of the comparator 36 becomes high, to produce the high level output signal at the terminal $\overline{RES}$.

On the other hand, if the frequency of the run signal from the microprocessor unit 2 becomes very low, for example, lower than 10 Hz, the reset circuit 3 produces the low level reset pulses to reset the state of the microprocessor unit 2. This state of operation is exemplary illustrated as a time period between $T_2$ and $T_3$ of FIGS. 5B and 5C. In this state, the level of the output signal of the window comparator 32 becomes high, to turn on the switch control circuit 33. As a result, the level of the control signal from the switch control circuit 33 falls to start the oscillation operation of the oscillator 34. Since the level of the output signal of the oscillator 34 periodically drops at a period determined by the time constant circuit 35, the comparator 36 produces a rectangular pulse train. Thus, the ne$\underline{\text{ga}}$tive going reset pulses are produced at the terminal $\overline{\text{RES}}$. With this reset signal, the microprocessor unit 2 is reset so that the calculation in the microprocessor unit is started from the initial state.

Further operation of the reset circuit 3 will be explained also with reference to FIGS. 5B and 5C. If, during a time period from $T_4$ to $T_5$, the number of the pulses of the run signal becomes excessively large, i.e., the frequency of the run signal becomes excessively high, the reset circuit 3 also produces the reset signal for resetting the microprocessor unit 2. Specifically, in this state, the wondow comparator 32 also produces the high level output signal to turn on the switch control circuit 33. Then the oscillator 34, the time constant circuit 35, the comperator 36, and the inverter circuit 37 are operated in the same manner as the previous case in which the frequency of the run signal becomes excessively low. In addition, it is assumed that the run signal is produced at a regular rate during a time period from $T_3$ to $T_4$ and a time period from time $T_5$ to $T_6$, and therefore, the reset circuit 3 does not produce the reset signal.

Figure 6:
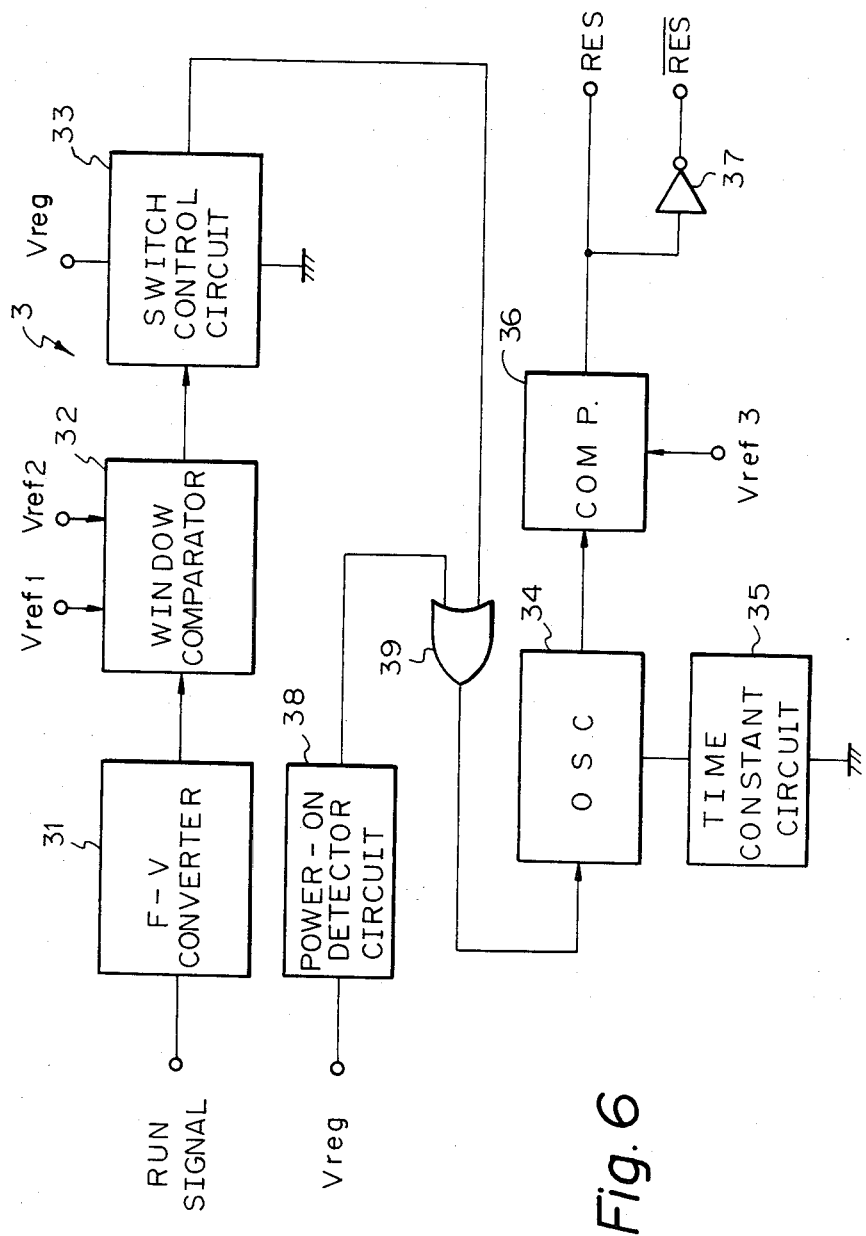
FIG. 6 is a block diagram of a second example of the circuit construction of the reset circuit 3.

Reference is now made to FIG. 6, in which the second example of the reset circuit 3 is illustrated. This example features the provision of a power-on detector circuit 38 which produces a low level output signal after throw-in of the power current. The low level output signal of the power-on detector circuit 38 is applied to an OR gate 39 which also receives the output signal of the switch control circuit 33. An output terminal of the OR gate 39 is connected to the oscillator 34 so that both of the output signals of the switch control circuit 33 and the power-on detector circuit 38 are transmitted to the oscillator 34. The OR gate 39 can be realized by a simple node of signal lines.

Since the oscillator 34 is applied with the low level signal from the OR gate 39 after throw-in of the power current, the same operation of the oscillator 34 as the previous example, that is, the generation of the low level output signal after throw-in of the power current, is also enabled in this example. The other parts of the circuit construction of this reset circuit are the same as those of the reset circuit of FIG. 4, and the explanation thereof is omitted. Further, if the power-on detector circuit 38 is constructed to produce a high level output signal after throw-in of the power current, the same operation as the previous cases can be enabled by applying the output signal of the power-on dector circuit 38 to the switch control circuit 33. In that case, the OR gate 39 is omitted.

As will be understood from the foregoing, the reset operation of the microprocessor unit after turn on of the power supply is insured by the arrangement of the voltage regulator according to the present invention. Further, the reset circuit produces the reset signal when the frequency of the run signal becomes exessively high, as in the case where the frequency of the run signal becomes excessively low.

In addition, since the regulator circuit 1 and the reset circuit 3 are formed in a common integrated circuit, there are several advantages such that the wiring between these circuits is eliminated and the space factor of these parts can be reduced.

Preferred embodiments of the present invention has been described above. It should be understood, however, that the foregoing description has been for the purpose of illustration only, and is not intended to limit the scope of the present invention. Rather, there are numerous equivalents to the preferred embodiment.

What is claimed is:

1. A voltage regulator for a microprocessor unit comprising:
    a regulator means for receiving an input voltage from a power supply and in response supplying a regulated voltage to the microprocessor unit which produces run signals at a regular rate during executing program steps normally, said regulated voltage having a particular rise time following turn on of the power supply; and
    a reset means for applying a reset signal to the microprocessor unit upon receipt of a power supply current and if the frequency of said run signal is out of a normal range, said reset means receiving a voltage from said regulator means and producing the reset signal having a duration sufficiently longer than a period in which the regulated voltage applied to the microprocessor unit is raised to a steady state level after turn on of the power supply.

2. A voltage regulator as recited in claim 1, wherein said reset means comprising:
    a frequency to voltage converter for receiving said run signals and producing a voltage signal whose level is substantially proportional to the frequency of the run signal;
    a window comparator for comparing the level of the voltage signal from the frequency to voltage converter with a pair of reference voltages determining a voltage range, and producing a detection output signal when the level of the voltage signal is out of said range determined by the reference voltages;
    an oscillator means with a time constant circuit, for receiving said regulated voltage from said regulator means, and producing a constant level output signal and an oscillation signal having a frequency determined by said time constant circuit when a control signal is applied thereto, said oscillator means having a delay characteristics due to the time constant circuit at a generation of the constant level output signal after application of the regulated voltage from the regulator means;
    a switch control means for receiving said detection output signal from the window comparator and producing the control signal for said oscillator means to start the generation of the oscillation signal; and
    a compartor means for receiving the output signal of the oscillator means and producing a rectangular reset pulse trains by comparing the level of the output signal of the oscillator means with a predetermined reference voltage.

3. A voltage regulator as recited in claim 2, further comprising a power-on detector means responsive to said regulated voltage from the regulator means, to produce a control signal to be applied to the oscillator means for the generation of the output signal of the oscillator means.

* * * * *